United States Patent
Eardley et al.

(10) Patent No.: US 6,170,928 B1
(45) Date of Patent: Jan. 9, 2001

(54) MULTI-LATCH DOOR FOR ELECTRICAL CABINETS

(75) Inventors: Edward C. Eardley, Piscataway; Alfred W. King, Mine Hill, both of NJ (US); Eric M. Lington, Loosdrec (NL); Peter A. Michaels, Jr., Randolph, NJ (US); Gerrit M. Moesbergen, Woudenberg (NL)

(73) Assignee: Lucent Technologies Inc., Murray Hill, NJ (US)

( * ) Notice: Under 35 U.S.C. 154(b), the term of this patent shall be extended for 0 days.

(21) Appl. No.: 09/106,399

(22) Filed: Jun. 29, 1998

(51) Int. Cl.⁷ .................................................. A47B 97/00
(52) U.S. Cl. ..................................... 312/223.1; 312/296
(58) Field of Search ............................. 312/223.1, 265.1, 312/265.2, 265.3, 265.4, 265.5, 405, 291, 292, 296, 326, 329, 221, 222; 49/303, 310, 395, 475.1, 503; 361/616, 641; 174/52.1, 66, 67

(56) References Cited

U.S. PATENT DOCUMENTS

| | | | |
|---|---|---|---|
| 1,748,670 | * | 2/1930 | Craft .................................. 312/296 X |
| 3,129,278 | * | 4/1964 | Watt, Jr. et al. .................. 312/296 X |
| 3,175,873 | * | 3/1965 | Blomquist et al. ................... 312/296 |
| 5,158,329 | * | 10/1992 | Schlack .................................... 292/87 |
| 5,232,277 | * | 8/1993 | Cassady et al. ...................... 312/296 |

FOREIGN PATENT DOCUMENTS

| | | | |
|---|---|---|---|
| 67348 | * | 12/1914 | (AT) .................................... 49/475.1 |
| 709298 | * | 5/1965 | (CA) ...................................... 312/329 |
| 579213 | * | 1/1994 | (EP) .................................. 312/223.1 |
| 1023866 | * | 3/1966 | (GB) ................................. 312/223.1 |

* cited by examiner

Primary Examiner—Peter M. Cuomo
Assistant Examiner—James O. Hansen
(74) Attorney, Agent, or Firm—Jean-Marc Zimmerman, Esq.

(57) ABSTRACT

A door for an outdoor cabinet such as those used in telephony or CATV systems. The door has a first gasketed section to provide a first area of the cabinet with an airtight seal for protecting components housed therein from the outside environment. This first section of the door also includes a multi-point compression latch. The door has a second ungasketed section which ventilates gases around its unsealed perimeter from a second area of the cabinet housing batteries. This second section of the door includes a slam latch that is automatically engaged when the compression latch on the first door section is engaged.

19 Claims, 4 Drawing Sheets

MULTI-LATCH DOOR FOR ELECTRICAL CABINETS

FIELD OF THE INVENTION

The present invention relates to the field of outdoor cabinets for housing electrical components and cables, and more particularly to a cabinet door having different sections with different types of latches and seals thereon to protect different types of components housed in the cabinet.

BACKGROUND OF THE INVENTION

Outdoor cabinets for housing electrical components are widely used in cable television (CATV) and other kinds of systems. These cabinets must protect the electrical components housed therein from harsh environmental conditions such as adverse weather. In addition, these cabinets must be secure to protect the electrical components inside from tampering and vandalism. It is also desirable that these cabinets allow easy access to the electrical components therein to facilitate their installation and servicing. Also, these cabinets should be as small and inconspicuous as possible. Finally, these cabinets should be relatively inexpensive to manufacture.

Conventional cabinets of the type just described have some of the foregoing characteristics, but they also have several drawbacks. For example, they typically use two different types of doors which are aligned one over the other, with a first door used to access an equipment area positioned in the top of the cabinet, and a second door used to access a battery and cable entry area positioned in the bottom of the cabinet. Two doors are used because each door is fabricated to have distinct protective characteristics dictated by the different types of components housed in the separate areas of the cabinet accessed by each respective door.

Specifically, the equipment area needs to be tightly closed and gasketed to protect the equipment housed therein from the outdoor environment. By contrast the battery and cable entry area needs to have an opening to allow cables to enter the cabinet from the ground. In addition, the battery and cable entry area is not gasketed since it has to be ventilated to allow hydrogen gas emitted by the batteries to escape. This required ventilation is typically achieved by means of louvers. Using two different types of doors rather than a single door increases the cost of manufacturing such conventional cabinets. In addition, more time and effort must be expended to unlock and open, and close and lock, respectively, two doors as opposed to a single door.

However, even if a single door were used, conventional cabinet doors are unlikely to achieve a sufficiently tight seal around the equipment area due to the louvers used to ventilate the battery and cable entry area. Also, a cabinet having a single door may have latching problems, since a single, multi-point latch may not provide an airtight seal. In addition, using a separate latch for each one of the two different door sections requires that extra time be expanded to lock and unlock each latch. Furthermore, an individual accessing the cabinet might forget to lock one of the latches. If a latch is not used for the bottom area of the door, this bottom area of the door may be easily pulled away from the cabinet and vandalized.

It is therefore an object of the invention to provide a door for an outdoor electrical cabinet that protects the equipment area from the outside environment while also ventilating hydrogen gas out from a separate battery and cable entry access area. It is another object of the invention to provide a door which is easy to open and close. Another object of the invention is to create a door which is less expensive to manufacture than two separate doors. It is a further object of the invention to provide an door that effectively discourages vandalism. It is also an object of the invention to provide a door that requires only a single action to close.

SUMMARY OF THE INVENTION

The present invention is a single door for covering two different areas of an electrical cabinet. The door has a gasketed first section to provide a first area of the cabinet with an airtight seal to protect components housed therein from the outside environment. This first section of the door also includes a multi-point compression latch. The door also includes an ungaske ted second section which allows battery gases to escape out from a second area of the cabinet around the unsealed perimeter of this second section. This second section of the door includes a slam latch that engages automatically when the compression latch of the first section of the door is engaged, thereby avoiding the need for the more complicated and expensive compression latch at the second section of the door, while providing adequate protection against vandalism. Also, a user does not have to engage the latch on the second section of the door to close the door.

DETAILED DESCRIPTION OF THE DRAWINGS

Figure 1:
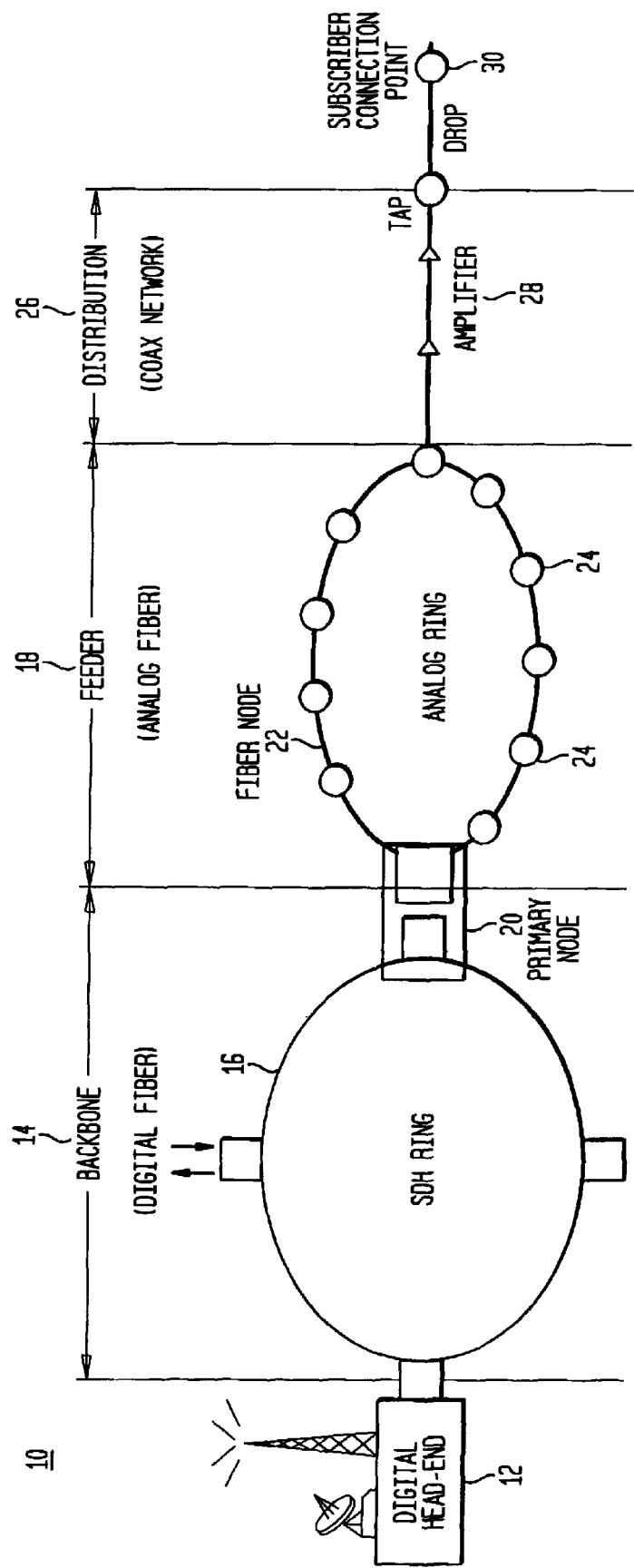
FIG. 1 shows a diagram of a cable telephony system utilizing an exemplary embodiment of a cabinet door according to the present invention.

FIG. 1 shows an exemplary cable telephony system 10. A CATV head end 12 receives electrical signals and transmits them to a digital fiber optic backbone network 14 which includes an SDH ring 16. These digital signals are then transmitted to an analog fiber feeder network 18 through a primary node 20. The feeder network 18 processes these signals in an analog ring 22 made up of fiber nodes 24. In the fiber nodes 24, the broadband fiber optic signals are converted to coaxial signals via a CATV wideband transmission shelf 34 shown in FIG. 2. These coaxial signals then are routed to a coaxial distribution network 26 which includes an amplifier 28. The amplified coaxial signals are then sent to the subscriber connection point 30.

Figure 2:
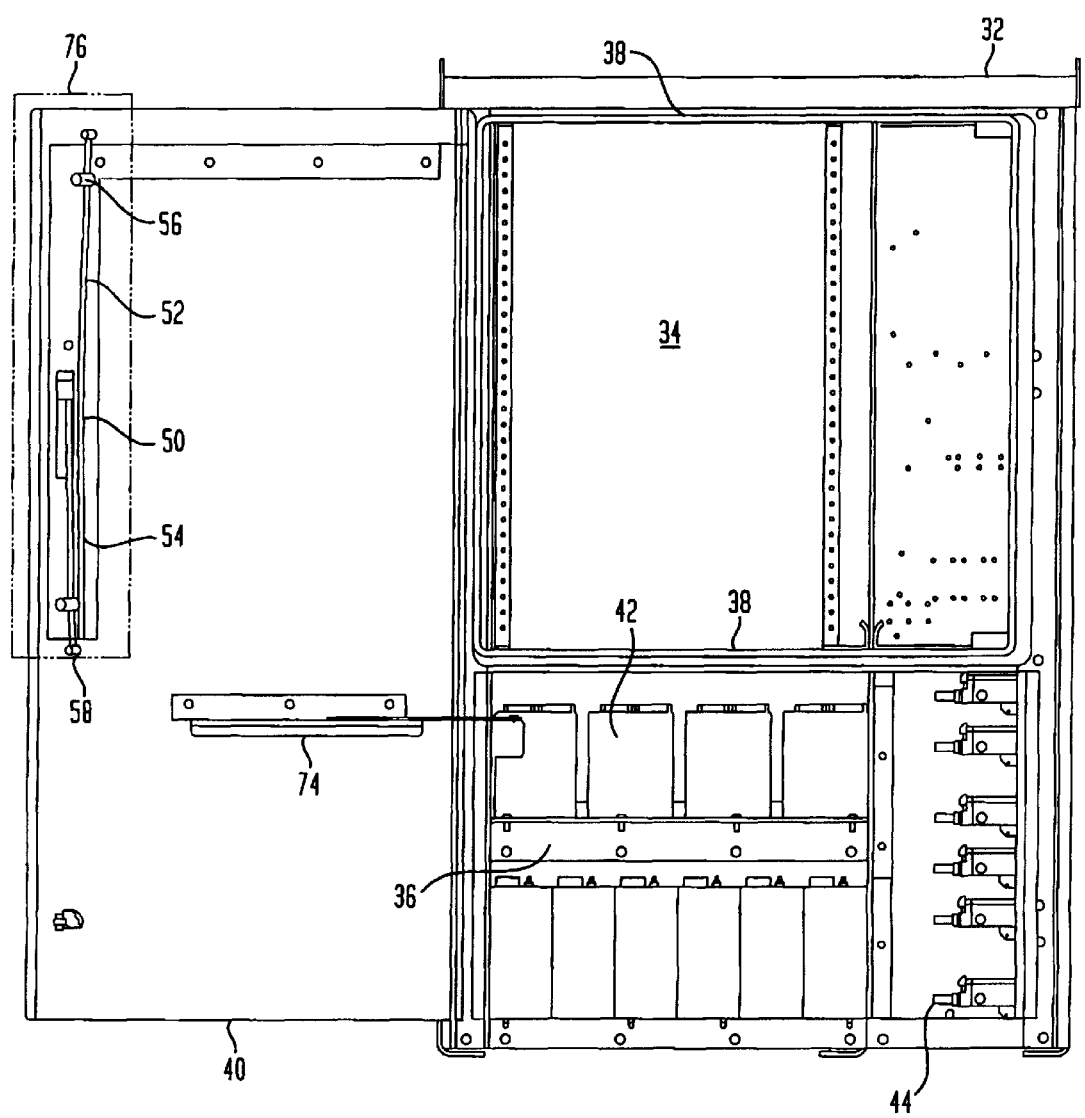
FIG. 2 shows a diagram of a cable telephony cabinet having an exemplary embodiment of a door according to the present invention.
Figure 3:
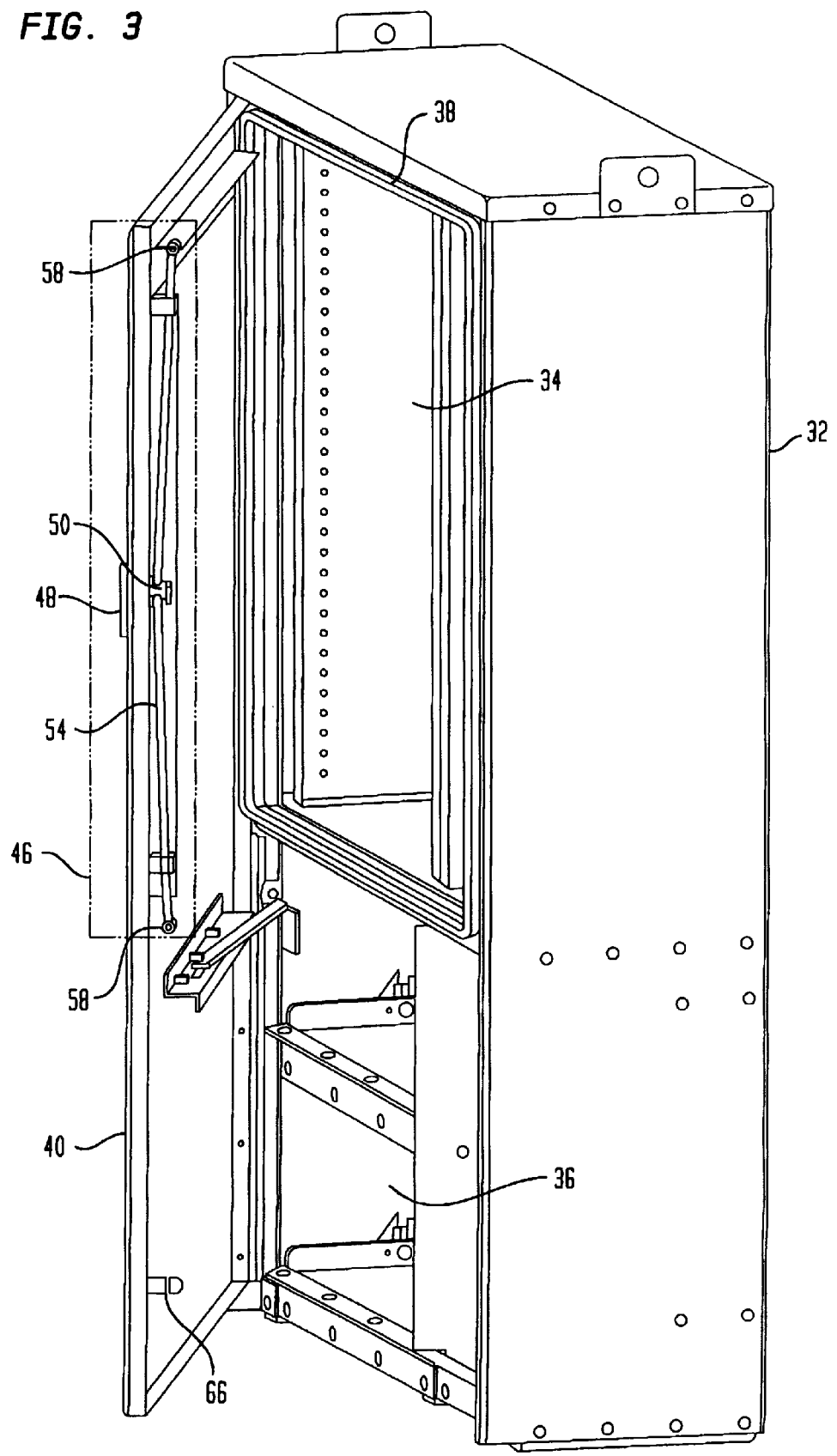
FIG. 3 shows another view of the door for a cable telephony cabinet shown in FIG. 2.

The fiber nodes 24 are housed in an outdoor cabinet 32, shown in FIGS. 2 and 3. The cabinet 32 has two separate internal areas for housing components: an equipment area 34; and a battery and cable entry area 36. The equipment area 34 houses electrical equipment which is not shown and which must be protected from the outside environment. This protection is afforded by the use of a conventional gasket 38 that is attached to the front perimeter of the equipment area 34. The gasket 38 forms a seal when compressed against the inner surface of the cabinet door 40.

The battery and cable entry area 36 houses a plurality of batteries 42 and their attached cables. The batteries 42 emit hydrogen gas which must be vented out of the cabinet 32. There is no gasket positioned between the battery and cable entry area 36 and the door 40. As a result, gas from the batteries can escape out from the cabinet 32 around the unsealed perimeter portion of the door 40 covering the battery and cable entry area 36. Consequently, unlike conventional electrical cabinets, louvers are not required to be used in the door 40. Moreover, the lack of an airtight seal will not damage the batteries 42 and other electrical devices 44 housed therein since they can withstand the limited exposure to the outside elements they experience in this area.

In accordance with a preferred embodiment of the invention, two different kinds of latching mechanisms are used to secure the door 40 closed. FIGS. 2 and 3 show that the upper section of the door 40 is secured to the cabinet 32 using a three point compression latch 46 that pulls the door tight against the gasket 38. This compression latch 46 includes a lift and turn handle 48 which is attached to a center cam 50. An upper actuator 52 and a lower actuator 54 are attached to the center cam 50 and are disposed vertically above and below the center cam 50, respectively. An upper roller 56 and a lower roller 58 are attached to the ends of the upper actuator 52 and the lower actuator 54, respectively. Three latch plates are attached to the cabinet 32 such that an upper latch plate 60 engages the upper roller 56, and a lower latch plate 62 engages lower roller 58 when the three point compression latch is closed. At the same time, a center latch plate 64 engages the center cam 50. The result is an airtight tight seal between the door 40 and the gasket 38.

Since the battery and cable entry area 36 does not need to be sealed, the three point latch does not extend down to that region. However, if that section of the door covering the battery and cable entry area 36 did not include a latch mechanism, the lower section would likely bow out from the force of the gasket 38 at the middle of the door. In addition, the door 40 could be vulnerable to vandalism because the lower section could be pulled away from the cabinet 32. However, if a separate manual latch were used, a user could forget to secure this lower latch. In addition, extra time and effort would have to be expended to close the second latch.

Figure 4:
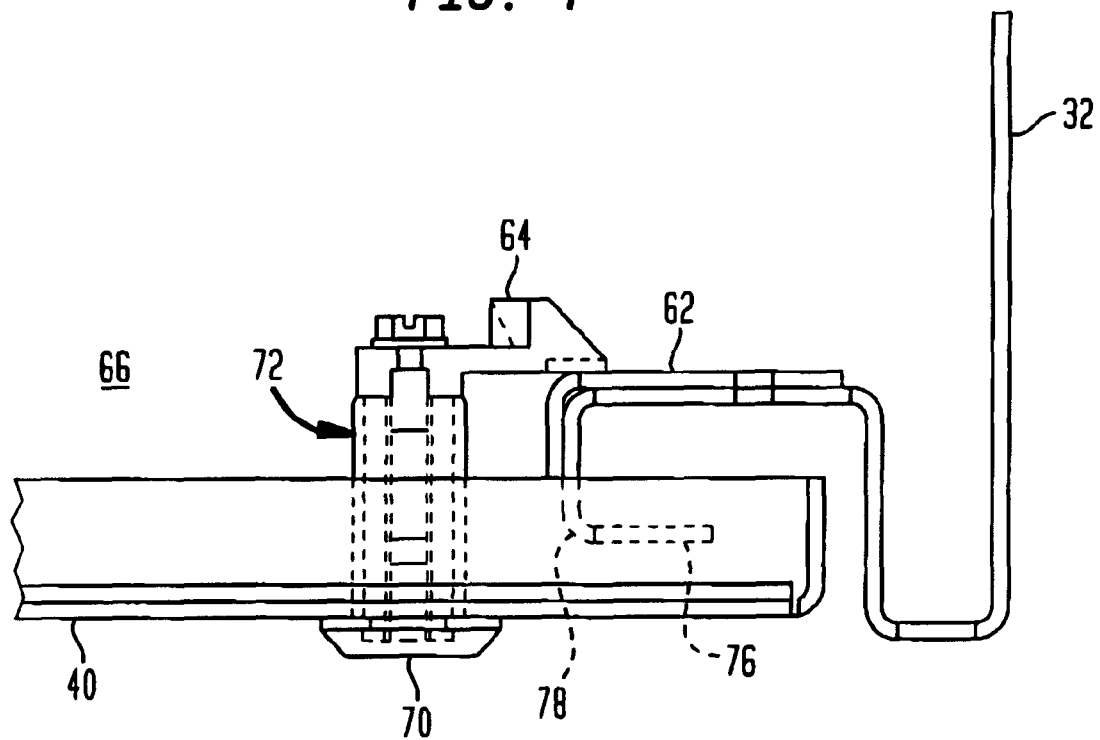
FIG. 4 shows additional details of the slam latch shown in FIG. 2.

Therefore, in accordance with a preferred embodiment of the invention, the lower area of door 40 is secured by a slam latch 66. This slam latch 66 is automatically engaged when the door 40 is closed and the compression latch 46 is engaged. As shown in FIG. 4, slam latch 66 engages the lower latch plate 62, which is attached to the side of the cabinet 32. The slam latch 66 includes a slam cam 68 attached to the inner end of a rotating lock unit 70. A torsion spring 72 biases the slam cam 68 in a rotational position of engagement with the lower latch plate 62. FIG. 4 shows the slam latch 66 in the closed door position.

To open the door 40, a tool or key is inserted into the outer end of the rotating lock unit 70. The compression latch 46 is first opened so that when the rotating lock unit 70 is turned in a direction against the bias of the torsion spring 72, slam cam 68 will rotate away from the lower latch plate 62, and the door 40 will be pushed open due to the compression forces on the gasket 38. A conventional door stay 74 limits how far the door opens and allows the door 40 to be locked in an open position.

When the door 40 is closed, slam cam 68 first engages a drip rail 76 on a front facing edge of a cabinet wall edge 78. Due to the angle of the face of the slam cam 68, this contact causes the slam cam to rotate out of the way of the drip rail until the door 40 reaches the position shown in FIG. 4. The torsion spring 72 then rotates the slam cam 68 into the position shown in FIG. 4 behind the lower latch plate 62. In this way the slam latch 66 automatically latches when the door 40 is closed.

Numerous modifications to and alternative embodiments of the present invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claims is reserved.

What is claimed is:

1. A door for a cabinet having first and second internal compartments comprising:
   a generally flat, unitary door member coupled to a cabinet having at least two internal compartments, the door member having a first section covering one side of a first internal compartment and a second section covering one side of a second internal compartment;
   a seal disposed adjacent to the one side of the first internal compartment covered by the first section of the door member;
   a latch mechanism attached to the first section of the door member for compressing the seal between the first section of the door and the one side of the first internal compartment when the door is closed thereby forming an airtight closure around the first internal compartment, wherein air can pass freely around the second section of the door member from inside the second internal compartment to outside the cabinet when the door is closed.

2. The door according to claim 1, wherein the the door is a continuous panel containing no ventilating opening.

3. The door according to claim 1, wherein the seal is a resilient gasket.

4. The door according to claim 1, further comprising a second latch mechanism disposed on the second section of the door member.

5. The door according to claim 4, wherein the first latch mechanism includes a latch handle and an actuator that engages with the perimeter of the one side of the first interior compartment when the latch handle is manually moved to a first position and the door is closed, and wherein the second latch mechanism is automatically actuated by the motion of the door moving from the open position to the closed position.

6. The door according to claim 5, wherein the first latch mechanism includes a plurality of spaced apart engagement elements each engaging a different portion of the perimeter of the one side of the first interior compartment when the latch handle is moved to the first position.

7. The door according to claim 5, wherein both the first and second latch mechanisms must be manually actuated to disengage and allow the door to open.

8. The door according to claim 5, wherein the first latch mechanism is a compression latch.

9. The door according to claim 5, wherein the second latch mechanism is a slam latch.

10. An electrical cabinet comprising:
   an enclosure having a first internal compartment and a second internal compartment separated from one another by an internal wall;
   a cabinet door coupled to the cabinet and movable between an open position and a closed position, the cabinet door having a first section covering one side of the first internal compartment and a second section covering one side of the second internal compartment;

a seal disposed adjacent to the one side of the first internal compartment and not disposed adjacent to the one side of the second internal compartment, thereby allowing air to pass freely around the second section of the door from inside the second internal compartment to outside the cabinet when the door is closed; and a latch attached to the first section of the door for compressing the seal between the first section of the door and the one side of the first internal compartment when the door is closed, thereby forming an airtight closure around the first internal compartment.

11. The cabinet according to claim 10, wherein the door is a continuous panel containing no ventilating opening.

12. The cabinet according to claim 10, wherein the seal is a resilient gasket.

13. The cabinet according to claim 10, wherein the second internal compartment is configured to house a battery and battery gases are ventilated around the perimeter of the second section of the door from inside the second internal compartment to outside the cabinet.

14. The cabinet according to claim 10, further comprising a second latch disposed on the second section of the door.

15. The cabinet according to claim 14, wherein the first latch includes a latch handle and an actuator that engages with the perimeter of the one side of the first internal compartment when the latch handle is manually moved in a first direction and the door is closed, and wherein simultaneously the second latch is automatically actuated by the motion of the door being closed.

16. The cabinet according to claim 15, wherein the first latch includes a plurality of spaced apart engagement elements each engaging a different portion of the perimeter of the one side of the first internal compartment when the latch handle is moved in the first direction.

17. The cabinet according to claim 15, wherein both the first and second latches must be manually actuated to disengage and allow the door to open.

18. The cabinet according to claim 15, where the first latch is a compression latch.

19. The cabinet according to claim 15, wherein the second latch is a slam latch.

* * * * *